US008284318B2

(12) United States Patent
Sato et al.

(10) Patent No.: US 8,284,318 B2
(45) Date of Patent: Oct. 9, 2012

(54) IMAGE PROCESSING APPARATUS, IMAGE PROCESSING METHOD, ELECTRO-OPTICAL DEVICE AND ELECTRONIC DEVICE

(75) Inventors: Shigemi Sato, Asahi-mura (JP); Michihiro Nagaishi, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 1371 days.

(21) Appl. No.: 11/936,387

(22) Filed: Nov. 7, 2007

(65) Prior Publication Data

US 2008/0122983 A1 May 29, 2008

(30) Foreign Application Priority Data

Nov. 7, 2006 (JP) ................................ 2006-301233
Jul. 30, 2007 (JP) ................................ 2007-197026

(51) Int. Cl.
*H04N 9/64* (2006.01)
*H04N 5/57* (2006.01)

(52) U.S. Cl. ....................................... 348/687; 348/571

(58) Field of Classification Search .................. 348/687, 348/571

See application file for complete search history.

(56) References Cited

U.S. PATENT DOCUMENTS 6,163,347 A * 12/2000 Fajardo ........................ 348/625
7,619,972 B2 * 11/2009 Gregory ........................ 370/231
8,043,216 B2 * 10/2011 Matsumura .................. 600/438
2002/0031263 A1 * 3/2002 Yamakawa .................... 382/199
2004/0263462 A1 * 12/2004 Igarashi ........................... 345/98
2006/0284974 A1 * 12/2006 Lipton et al. .................... 348/59
2009/0027549 A1 * 1/2009 Weisgerber .................. 348/441

FOREIGN PATENT DOCUMENTS

JP A-04-302289 10/1992
JP A-2003-298879 10/2003
JP A-2005-010579 1/2005
JP A-2005-055828 3/2005

OTHER PUBLICATIONS

Hitachi Displays, Ltd. "New Moving Image Technology 'Flexible BI' Developed for Digital TV IPS Liquid Crystal Panels," Apr. 2006 (with English Translation).

* cited by examiner

*Primary Examiner* — Pankaj Kumar
*Assistant Examiner* — Franklin Andramuno
(74) *Attorney, Agent, or Firm* — Oliff & Berridge, PLC

(57) ABSTRACT

An image processing apparatus includes a first frame image acquisition unit that acquires a plurality of first frame images constituting a moving image, a second frame image insertion section that generates a second frame image and inserts the second frame image including a white image between successive ones of the plurality of acquired first frame images, and a frame image output unit that outputs the plurality of first frame images with the second frame images inserted therebetween.

6 Claims, 9 Drawing Sheets

IMAGE PROCESSING APPARATUS, IMAGE PROCESSING METHOD, ELECTRO-OPTICAL DEVICE AND ELECTRONIC DEVICE

CROSS-REFERENCE TO RELATED APPLICATIONS

This application claims priority from Japanese Patent Application No. 2006-301233 filed in the Japanese Patent Office on Nov. 7, 2006, and Japanese Patent Application No. 2007-197026 filed in the Japanese Patent Office on Jul. 30, 2007, the disclosures of which are incorporated herein by reference in their entirety.

BACKGROUND

1. Technical Field

Embodiments of the present invention relate to an image processing apparatus, an image processing method, an electro-optical device and an electronic device.

2. Related Art

With use of electro-optical devices performing display in a hold mode such as liquid crystal devices, persistence of vision of a human viewer when a motion picture is displayed is remarkably observed compared to use of display devices performing display in an impulse mode such as cathode ray tubes (CRTs).

In some cases, edge portions of a moving object in a display image look blurred, which is called motion picture blurring.

For example, techniques to suppress such motion picture blurring are disclosed in JP-A-H4-302289, JP-A-2005-10579 and a news release entitled "Development of a new technology for motion pictures "Flexible B1" in in-plane switching (IPS) liquid crystal panels for digital television" issued by Hitachi Displays, Ltd., Apr. 10, 2006:http://www.hitachi.co.jp/New/cnews/month/2006/04/0410a.html) (hereinafter, referred to as first, second and third related art examples, respectively).

In the first related art example, light emission time between frames is restricted by controlling light emission luminance so that blurring of motion pictures is suppressed.

In the third related art example, an original image corresponding to one screen is displayed in the form of two images.

One image is brighter than the original image and the other is darker than the original image.

Thus, a pseudo-impulse mode is realized without a decrease in brightness.

In the second related art example, part of an image is covered with a black belt, and the position of the belt moves from up to down.

Although only part of an image is covered with the belt, as a result of integration of one frame by period, a period during which no picture is displayed is provided in one frame.

This achieves the same effects as when inserting a black image into the whole image (hereinafter, referred to as "black insertion" for brevity).

However, in the technique described in the first related art example, light emission time between frames is restricted, causing the entire image to become dark.

In the technique described in the third related art example, it can be suppressed to darken the entire image; however, the image processing is complex (e.g. real-time generation of an image with a portion thereof highlighted).

In the technique described in the second related art example, although the darkness of the entire image can be suppressed as in the third related art example, the same brightness as in an image without black insertion cannot be achieved.

FIG. 9 shows a related art example of black insertion between frame images that constitute a moving image.

In the figure, images designated by f1 and f3 illustrate frame images f1 and f3 constituting a moving image, and images designated by f2 and f4 illustrate frame images f3 and f4 used for black insertion, respectively.

Black insertion is performed such that the frame image f2 follows the frame image f1 and the frame image f4 follows the frame image f3, as shown in the figure, thereby enabling suppression of motion picture blurring of the frame images f1 and f3.

However, when the frame images f1 to f4 are displayed as a picture, the entire image is darker than the original image because the frame images f2 and f4 are black.

SUMMARY

According to one of advantageous effects of embodiments of the invention, motion picture blurring can be suppressed without a decrease in brightness of the entire image.

Also, motion picture blurring can be suppressed without the necessity of complex image processing.

As described above, it is inevitable in an image processing method by black insertion between frame images constituting a moving image as shown in FIG. 9 that the resulting image is darker than the original image.

The inventor has conducted an experiment for purposes of improvement in this respect and found the following knowledge.

Black insertion employed in a related art example provides a period during which light is not emitted.

This causes such effects that a viewer's memory of the previous image is erased, resulting in suppression of motion picture blurring.

It has been confirmed by the experiment that the same effects as those of black insertion can be obtained by providing a period during which the whole screen is white.

An image processing apparatus of one aspect of the invention includes a first frame image acquisition unit that acquires a plurality of first frame images constituting a moving image, a second frame image insertion section that generates a second frame image including a white image, which represents an image in white, and inserts the second frame image between successive ones of the plurality of acquired first frame images, and a frame image output unit that outputs the plurality of first frame images with the second frame images inserted therebetween.

According to the image processing apparatus of one aspect of the invention, a first frame image acquisition unit acquires a plurality of first frame images constituting a moving image, a second frame image insertion section generates a second frame image including a white image and inserts the second frame image including the white image between successive ones of the plurality of first frame images.

Then, a frame image output unit outputs the plurality of first frame images with the second frame images inserted therebetween.

Thus, when frame images output from the frame image output unit are displayed as a picture, a second frame image including a white image is present between successive ones of first frame images.

As a result, a period for displaying one frame of the picture includes a part (sub-period) during which no image is displayed.

This makes it possible to suppress motion picture blurring.

The inserted second frame image is a white image, and therefore suppression of motion picture blurring is not associated with a decrease of the brightness of the whole image.

Further, this image processing can be easily realized without the necessity of complex image processing.

In the above-mentioned image processing apparatus of one aspect of the invention, the second frame image insertion section includes a high-rate frame image generator that generates a high-rate frame image consecutively, for example, time-sequentially consecutive, to each of the plurality of acquired first frame images, a white image pattern generator that generates a white image pattern including the white image for transforming the high-rate frame image into the second frame image, and a second frame image transformer that transforms the high-rate frame image into the second frame image based on the white image pattern.

In the above-mentioned image processing apparatus of one aspect of the invention, the second frame image transformer transforms the high-rate frame image into the second frame image by setting the white image to the whole of the high-rate frame image based on the white image pattern.

In the above-mentioned image processing apparatus of one aspect of the invention, the high-rate frame image generator generates n (n is an integer equal to or greater than two) frames of the high-rate frame image time-sequentially consecutive to one of the first frame images.

The n frames of the high-rate frame image have the same image as the one of the first frame images.

Each of the n frames of the high-rate frame image may be divided into n subimages, and the second frame image transformer may transform each of the n frames of the high-rate frame image into the second frame image by setting the white image to one subimage of the n subimages for each of the n frames of the high-rate frame image.

The one subimage is located at a division position that is different among n frames of the high-rate frame image.

In the above-mentioned image processing apparatus of one aspect of the invention, the second frame image insertion section further includes a brightness detector that detects a brightness level of the acquired first frame images.

The white image pattern generator sets a luminance value of the white image included in the white image pattern in accordance with the detected brightness level such that the luminance value of the white image is increased if the detected brightness level is high whereas the luminance value of the white image is decreased if the detected brightness level is low.

In the above-mentioned image processing apparatus of one aspect of the invention, the white image pattern generator sets the luminance value of the white image by comparing the detected brightness level with a predetermined threshold value such that the luminance of the white image value is increased if the detected brightness level exceeds the threshold value whereas the luminance value of the white image is decreased if the detected brightness level does not exceed the threshold value.

An image processing method according to another aspect of the invention includes acquiring a plurality of first frame images constituting a moving image, generating a second frame image including a white image that represents an image in white and inserting the second frame image between successive ones of the plurality of acquired first frame images, and outputting the plurality of first frame images with the second frame images inserted therebetween.

An electro-optical device according to a further aspect of the invention includes any one of the above-mentioned image processing apparatuses.

An electronic device according to a still further aspect of the invention includes any one of the above-mentioned image processing apparatuses.

BRIEF DESCRIPTION OF THE DRAWINGS

Embodiments of the invention will be described with reference to the accompanying drawings, wherein like numbers reference like elements.

FIG. 4A stows a white image pattern, and FIG. 4B shows second frame images inserted between first frame images;

FIG. 5A shows two kinds of white image pattern that differ each other in luminance value, and FIG. 5B shows second frame images inserted between first frame images;

FIG. 6A shows a high-rate frame image divided into subimages, FIG. 6B shows white image patterns, and FIG. 6C shows high-rate frame images overwritten with white images;

DETAILED DESCRIPTION OF EMBODIMENTS

First Embodiment

An image processing apparatus according to a first embodiment of the invention will be described below with reference to the accompanying drawings.

Schematic Structure of Image Processing Apparatus

A schematic structure of an image processing apparatus according to the first embodiment of the invention will first be described.

Figure 1:
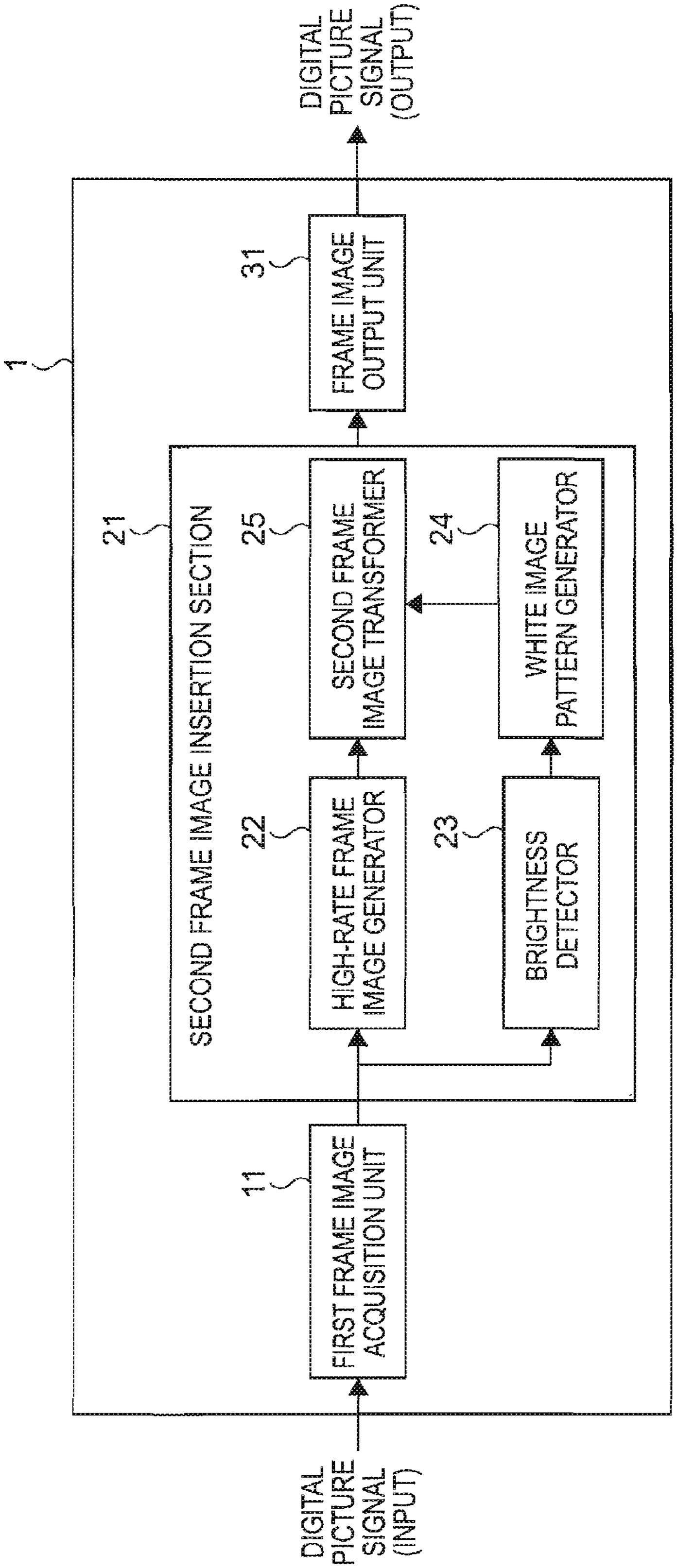
FIG. 1 is a block diagram showing an example of a schematic structure of an image processing apparatus according to a first embodiment of the invention.

FIG. 1 is a block diagram showing a schematic structure of an image processing apparatus according to the first embodiment of the invention.

As shown in the figure, an image processing apparatus 1 includes a first frame image acquisition unit 11, a second frame image insertion section 21 and a frame image output unit 31.

The second frame image insertion section 21 includes a high-rate frame image generator 22, a brightness detector 23, a white image pattern generator 24 and a second frame image transformer 25.

The first frame image acquisition unit 11 receives a moving image defined by a predetermined number of pixels and a predetermined pixel value in RGB form, etc., as digital picture signals, from an external device such as a digital video disk (DVD) player, a video cartridge recorder or a personal computer to acquire a plurality of first frame images constituting the moving image.

Here, one first frame image represents a still image that corresponds to one frame of a moving image.

The second frame image insertion section 21 generates a second frame image the whole or part of which is an image in white (hereinafter, an "image in white" referred to as a "white image" for brevity), and then inserts the generated second frame image between successive ones of the plurality of acquired first frame images.

The frame image output unit 31 outputs, as digital picture signals, a plurality of first and second frame images in which the second frame images are inserted between successive ones of the plurality of acquired first frame images.

The high-rate frame image generator 22 disposed in the second frame image insertion section 21 generates n (n is an integer equal to or greater than 1) high-rate frame images that are time-sequentially consecutive to each of the plurality of acquired first frame images.

As a result, the number of frame images is increased by a factor of (n+1).

The rate at which frames are displayed is also increased by a factor of (n+1).

For example, as one high-rate frame image that follows one first frame image is generated, the number of frame images is doubled and the rate at which frames are displayed is doubled.

As two high-rate frame images are generated, the number of frame images are tripled and the rate are tripled.

The brightness detector 23 detects the brightness level of each of the plurality of acquired first frame images.

To detect the brightness level, calculation represented by the expression below is performed for all pixels included in one first frame image, thereby obtaining lightness signals from each pixel.

The average value of calculated lightness signals is determined as the brightness level of the first frame image.

$$\text{Lightness signal}=0.3\times R+0.6\times G+0.1\times B$$

The method to detect the brightness level is not limited to the above-mentioned method.

Other methods may be used.

The white image pattern generator 24 generates a white image pattern used when transforming a high-rate frame image generated by the high-rate frame image generator 22 into a second frame image.

Set in the white image pattern is a white image with which a high-rate frame image is overwritten.

The luminance value of the white image is determined in accordance with the brightness level of a first frame image detected by the brightness detector 23.

The second frame image transformer 25 transforms a high-rate frame image into a second frame image based on a white image pattern generated by the white image pattern generator 24.

Specifically, a high-rate frame image is transformed into a second frame image by overwriting the high-rate frame image with a white image set in a white image pattern.

The image processing apparatus 1 includes, although not shown in the figure, a storage medium in which programs for controlling the above-described units are stored, a central processing unit (CPU) for executing the programs, and a random access memory (RAM) that stores data necessary for execution of programs.

By executing the programs by the CPU, processing of the above-described units is realized.

Examples of the storage medium as used herein include semiconductor storage media such as a RAM and a read only memory (ROM), magnetic storage media such as a floppy disk (FD) and a hard disk (HD), optical reading storage media such as a compact disk (CD), a compact disk video (CDV), a laser diode (LD) and a digital video disk (DVD), and magnetic storage/optical reading storage media such as a magneto-optical disk (MO).

Examples of the storage medium include any storage medium from which data can be read by a computer, regardless of whether the reading method is an electronic, magnetic or optical reading method.

The above-described units are a mixture of units that function by using dedicated programs alone and units that function by controlling hardware with dedicated programs.

Alternatively, functions of the above-described units may be designed to be performed by dedicated hardware alone.

Operations of Image Processing Apparatus

Next, operations of an image processing apparatus according to the first embodiment will be described.

Figure 2:
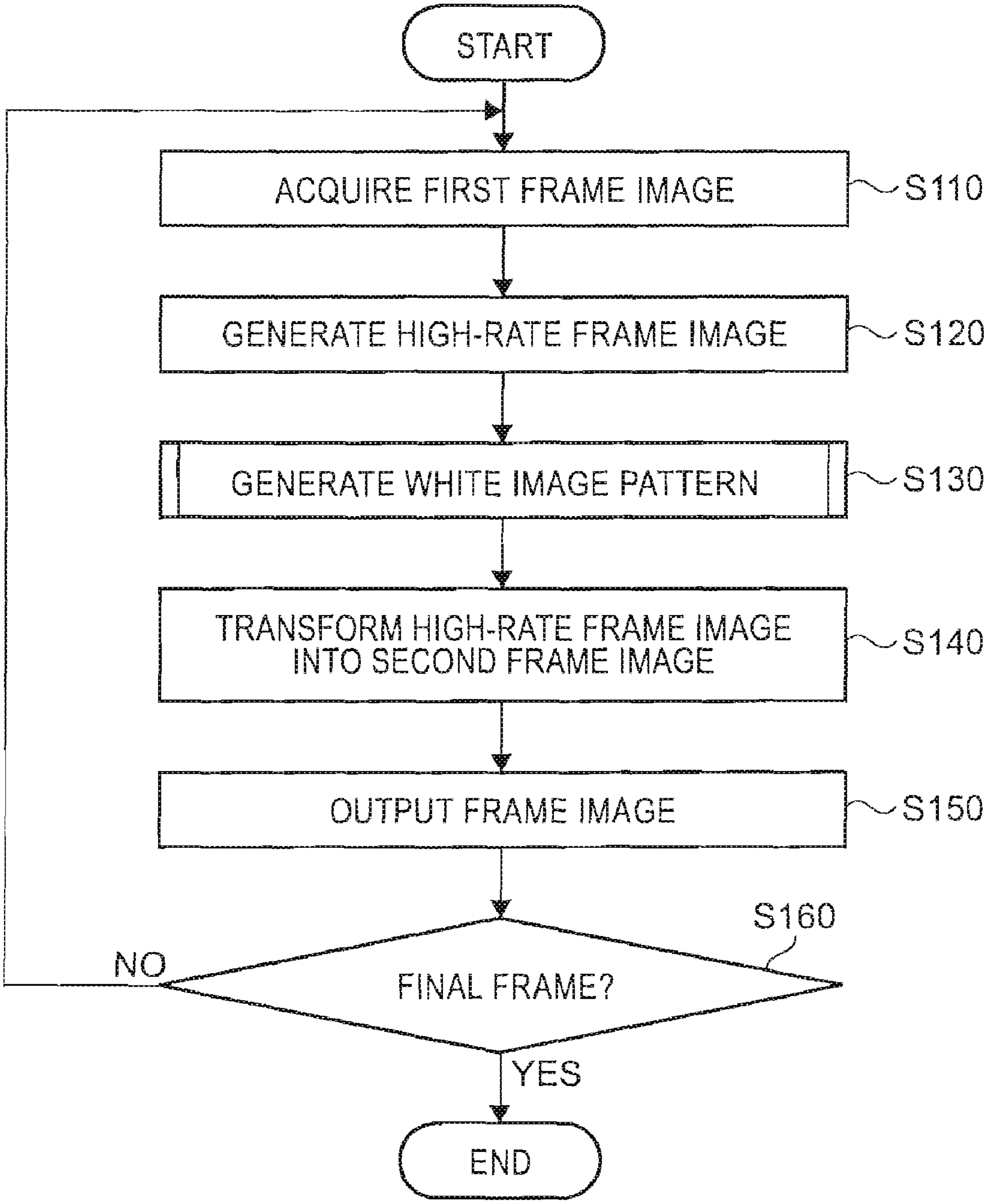
FIG. 2 is a flow chart showings operations of the image processing apparatus according to the first embodiment of the invention.

FIG. 2 is a flow chart showing operations of the image processing apparatus according to the first embodiment of the invention.

In step S110, the first frame image acquisition unit 11 receives a moving image input as digital picture signals from an external device, and time-sequentially acquires a plurality of first frame images constituting the moving image one frame by one frame.

In the subsequent steps S120 to S160, processing is performed for each acquired first frame image.

In step S120, the high-rate frame image generator 22 generates n high-rate frame images that follow each first frame image acquired in step S110.

In step S130, the white image pattern generator 24 generates a white image pattern used when transforming each of n high-rate frame images generated in step S120 into a second frame image.

Here, a white image pattern for overwriting the whole of a high-rate frame image is generated.

Note that details of operations of generating a white image pattern will be described later.

In step S140, the second frame image transformer 25 transforms n high-rate frame images into n second frame images based on the white image pattern generated in step S130.

Here, by overwriting the whole of each high-rate frame image with a white image set in the white image pattern, each high-rate frame image is transformed into a second frame image.

In step S150, the acquired first frame image and n second frame images that are time-sequentially consecutive to this image and that have been transformed in step 140 are output as digital picture signals to a display or the like.

A frame image output in this way has such a structure that a white image is inserted between successive ones of a plurality of acquired first frame images.

In step S160, it is determined whether or not the acquired first frame image is of the final frame.

If the image is of the final frame, operations of the image processing apparatus 1 end.

In contrary, if the image is not of the final frame, the process returns to step S110 to acquire a first frame image corresponding to the next frame of the moving image.

Operations of Generating White Image Pattern

Next, details of operation of generating a white image pattern will be described.

Figure 3:
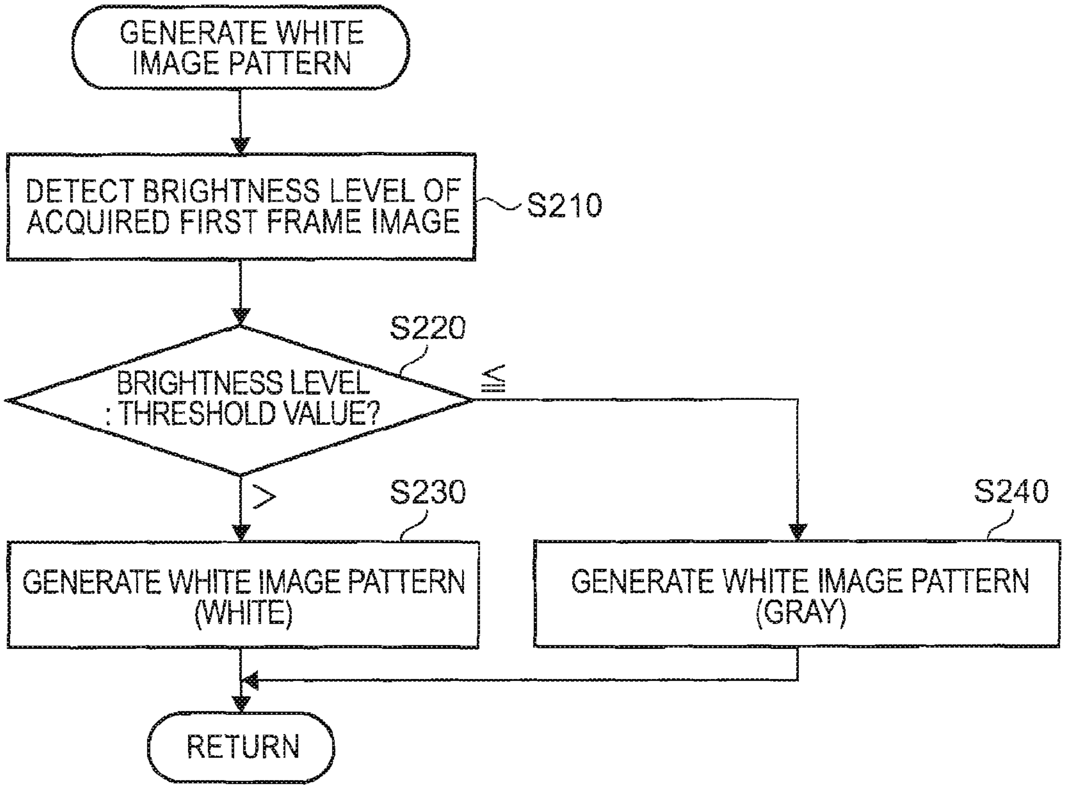
FIG. 3 is a flow chart showing operations of generating a white image pattern.

FIG. 3 is a flow chart showing operations of generating a white image pattern.

In step S210, the brightness detector 23 calculates lightness signals from all pixels included in the acquired first frame image, and calculates the average value of the lightness signals, thereby detecting the brightness level.

In step S220, by comparing the brightness level detected in step S210 with a predetermined threshold value, it is determined whether the first frame image is light or dark.

If the brightness level exceeds the predetermined threshold value, that is, if it is determined that the first frame image is light, the process proceeds to step S230, where the luminance value of a white image set in a white image pattern is increased.

Thus, the resulting color of the white image is normal white (white with an increased luminance value).

On the other hand, if the brightness level does not exceed the predetermined threshold value, that is, if it is determined that the first frame image is dark, the process proceeds to step S240, where the luminance value of a white image set in a white image pattern is slightly decreased.

Thus, the resulting color of the white image is gray (white with a slightly decreased luminance value).

As described above, operations of generating a white image pattern are completed and description will return to processes in a flow chart shown in FIG. 2.

Note that a first frame image acquisition process according to embodiments of the invention corresponds to the above step S110.

A second frame image insertion process according to embodiments of the invention corresponds to the above steps S120 to S140.

A frame image output process according to embodiments of the invention corresponds to the above step S150.

Example of Frame Image after Transformation

An example of a frame image transformed based on, a white image pattern will be described.

Figure 4A:
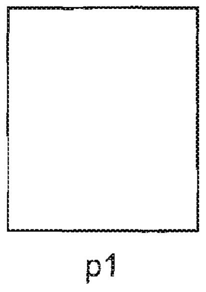
FIGS. 4A and 4B show an example of frame images that are transformed based on a white image pattern.
Figure 4B:
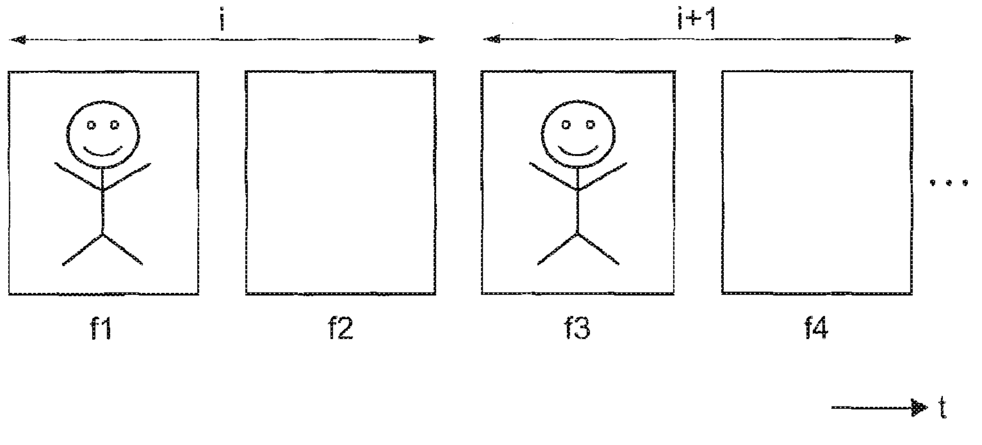

FIGS. 4A and 4B show an example of frame images transformed based on a white image pattern; FIG. 4A shows a white image pattern, and FIG. 4B shows second frame images inserted between first frame images.

With reference to FIG. 4A, a white image pattern p1 is generated in step S130 in FIG. 2 such that the color of the whole image is normal white.

With reference to FIG. 4B, an image indicated by f1 is the ith acquired first frame image in step S110, and an image indicated by f3 is the (i+1)th acquired first frame image.

With reference to FIG. 4B, an image indicated by f2 is a second frame image f2 that is transformed by overwriting one high-rate frame image generated in step S120 with the whole of the white image pattern p1 shown in FIG. 4A in step S140.

An image indicated by f4 is a second frame image f4 transformed in the same way as the above.

A horizontal axis t in FIG. 4B and the subsequent figures indicates the passage of time from left to right in the figures.

This shows that frame images are arranged in time sequence.

As shown in FIG. 4B, a moving image received from an external device is transformed into a group of frame images that includes a white image inserted between successive ones of first frame images constituting the moving image.

Figure 5A:
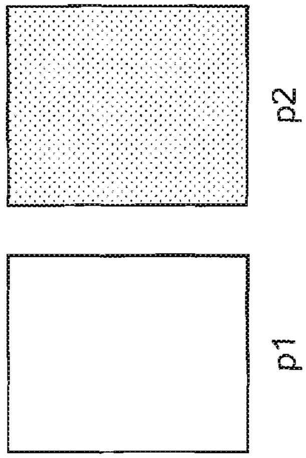
FIGS. 5A and 5B show an example of frame images that are transformed based on white image patterns having different luminance values.
Figure 5B:
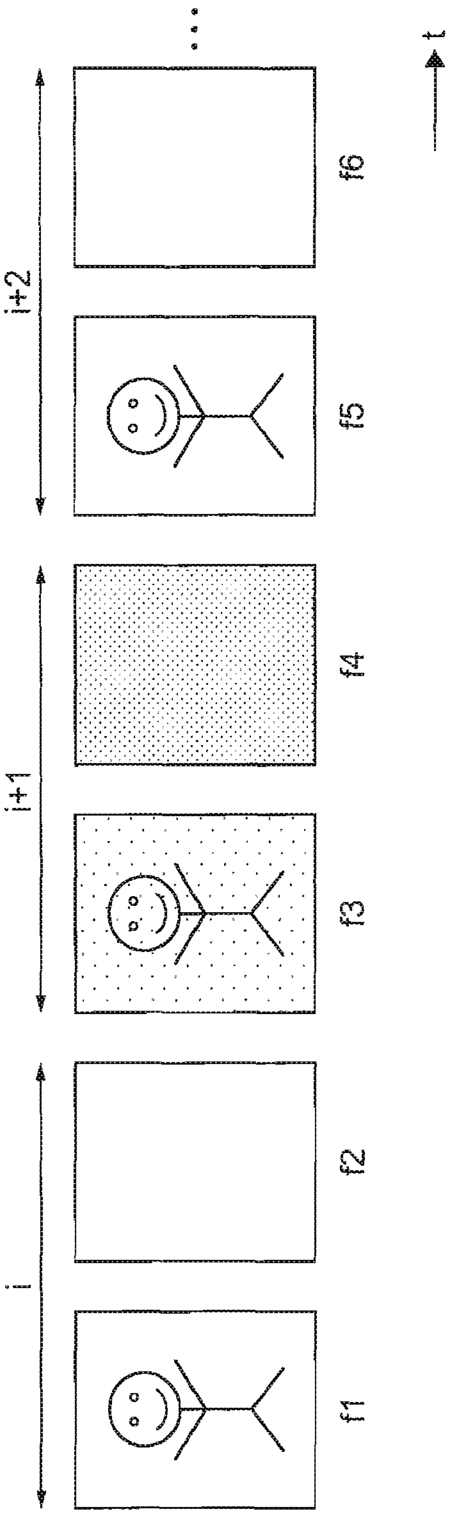

FIGS. 5A and 5B show an example of frame images transformed based on white image patterns having different luminance values; FIG. 5A shows two kinds of white image patterns that differ from each other in luminance value, and FIG. 5B shows first frame images with second frame images inserted therebetween.

Two kinds of white image patterns shown in FIG. 5A are the white image pattern p1 in which the whole image is normal white (white with an increased luminance value) and a white image pattern p2 in which the whole image is gray (white with a slightly decreased luminance value).

With reference to FIG. 5B, images indicated by f1, f3 and f5 are the ith acquired first frame image f1, the (i+1)th acquired first frame image f3 and an (i+2)th acquired first frame image f5, respectively.

Images indicated by f2 and f6 are the second frame image f2 and a second frame image f6, respectively, each transformed by overwriting a high-rate frame image with the whole of the white image pattern p1 (white) shown in FIG. 5A.

On the other hand, an image indicated by f4 is the second frame image f4 transformed by overwriting a high-rate frame image with the whole of the white image pattern p2 (gray).

Regarding examples shown in FIGS. 5A and 5B, the brightness levels of the first frame images f1, f3 and f5 shown in FIG. 5B are detected in step S210 in FIG. 3, and it is determined in step S820 whether each of the images is light or dark.

As the results of determination, the first frame images f1 and f5 shown in FIG. 5B are light, and therefore the colors of the second frame images f2 and f6 are set to normal white.

On the other hand, it is determined that the first frame image f3 shown in FIG. 5B is dark, and therefore the color of the second frame image f4 is set to gray.

Thus, as shown in FIG. 5B, a moving image received from an external device is transformed into a group of frame images.

The group of frame images includes images inserted between successive ones of first frame images constituting the moving image.

Each color of the inserted images is normal white or gray that is set in accordance with the brightness of each of the first frame images.

In the above examples shown in FIGS. 4B and 5B, one high-rate frame image is generated from one first frame image in step S120.

However, the number of high-rate frame images generated from one first frame image is not limited to one.

For example, generated from one first frame image may be two or three high-rate frame images, each of which is overwritten with a white image pattern so that the high-rate frame images are transformed into second frame images.

Effects

As described above, in the image processing apparatus 1 of this embodiment, a moving image received from an external device is transformed into a group of frame images that includes a white image inserted between successive ones of first frame images constituting the moving image, as in an example shown in FIG. 4B.

Figure 9:
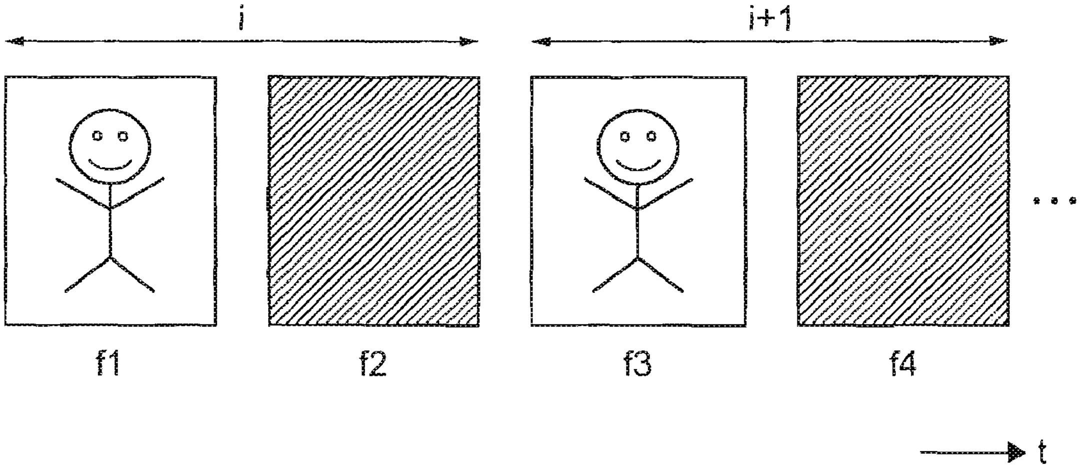
FIG. 9 shows a former example of black insertion between frame images constituting a moving image.

In a related art example shown in FIG. 9, black insertion is performed such that the frame image f2 follows the frame image f1 and the frame image f4 follows the frame image f3, thereby enabling suppression of motion picture blurring of the frame images f1 and f3.

However, when the frame images f1 to f4 are displayed as a picture, the entire image is darker than the original image because the frame images f2 and f4 are black.

On the other hand, in an example shown in FIG. 4B in this embodiment, the frame image f2 as a white image is inserted following the frame image ft, and the frame image f4 as a white image is inserted following the frame image f3, thereby enabling suppression of motion picture blurring of the frame images f1 and f3.

When the frame images f1 to f4 are displayed as a picture, the entire image is not dark compared to the original image because the frame images f2 and f4 are white images.

In other words, it is possible to suppress the motion picture blurring without a decrease in brightness of the entire image.

In a related art example shown in FIG. 9, the number of frame images inserted for black insertion between frame images constituting a moving image may be increased in order to adjust the suppression effects of motion picture blurring.

In this case, there is a problem in that when displayed as a picture, the entire image becomes darker because of an increased number of black images.

On the other hand, in an example shown in FIG. 4B in this embodiment, the number of frame images serving as white images inserted between frame images constituting a moving image can be increased.

In this case, when frame images are displayed as a picture, the entire image never becomes dark because of an increased number of white images.

In other words, it is possible to adjust suppression effects of the motion picture blurring without decreasing brightness of the entire image.

In the image processing apparatus 1 of this embodiment, as shown in an example in FIG. 5B, a moving image received from an external device is transformed into a group of frame images.

The group of frame images includes images inserted between successive ones of first frame images constituting the moving image.

Each color of the inserted images is normal white or gray that is set in accordance with the brightness of each of the first frame images.

If dark images continue in an image scene of a moving image, inserting a white image having a high luminance value between first frame images constituting the image scene may reduce the contrast of the entire image of the image scene.

therefore, in an example shown in FIG. 5B, the color of an image to be inserted is set to normal white if the first frame image is light, or to gray if the first frame image is dark, based on the brightness level of the first frame image.

Thus, regarding the case in which dark images continue in an image scene of a moving image, it is also possible to suppress the motion picture blurring without reducing image contrast.

Second Embodiment

An image processing apparatus according to a second embodiment of the invention will next be described with reference to the accompanying drawings.

Schematic Structure and Operations of Image Processing Apparatus

A schematic structure of the image processing apparatus according to the second embodiment of the invention is the same as the above-described schematic structure shown in FIG. 1 of the image processing apparatus according to the first embodiment.

Operations of the image processing apparatus according to the second embodiment are basically the same as the above-described operations shown in FIGS. 2 and 3 of the image processing apparatus according to the first embodiment, except for part of processing in a flow chart shown in FIG. 2.

Specifically, part of processing differs in a process of generating a high-rate frame image in step S120, a process of generating a white image pattern in step S130, and a process of transforming a high-rate frame image into a second frame image in step S140, shown in FIG. 2.

The process of generating a high-rate frame image in step S120 in the second embodiment differs from that in the first embodiment in that n (n is an integer equal to or greater than two) high-rate frame images each having the same image as the acquired first frame image are generated following the first frame image.

The process of generating a white image pattern in step S130 in the second embodiment differs from that in the first embodiment in that a white image pattern is generated for overwriting a part, not the whole, of each high-rate frame image.

The process of transforming a high-rate frame image into a second frame image in step S140 in the second embodiment differs from that in the first embodiment in that the high-rate frame image is transformed into the second frame image by overwriting a part, not the whole, of each high-rate frame image with a white image.

In step S140 in the above-mentioned case in the second embodiment, part of each high-rate frame image that is overwritten with a white image represents one of n subimages when each of n high-rate frame images is divided into n subimages.

One of n subimages that is to be overwritten is located at a division position in each of n high-rate frame images.

The division position is different among the n high-rate frame images.

Figure 6A:
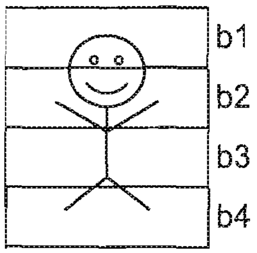
FIGS. 6A to 6C show an example of frame images parts of which are transformed based on white image patterns.
Figure 6B:
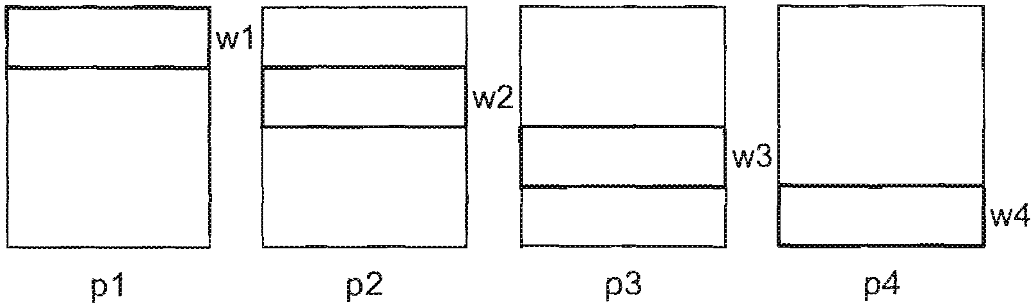
Figure 6C:
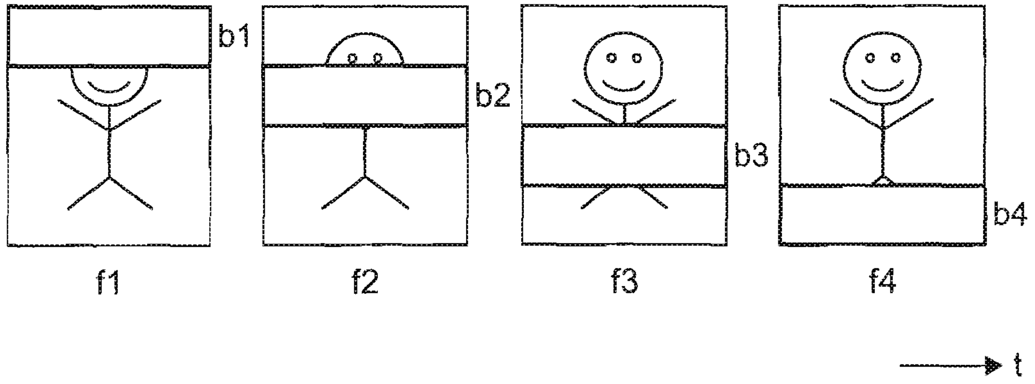

FIGS. 6A to 6C show an example of frame images parts of which are transformed based on white image patterns; FIG. 6A shows a high-rate frame image divided into subimages. FIG. 6B shows white image patterns, and FIG. 6C shows high-rate frame images overwritten with white images.

In the high-rate frame image shown in FIG. 6A, the entire image is divided into four subimages b1 to b4.

In white image patterns p1 to p4 shown in FIG. 6B, white images are set one by one in divided areas w1 to w4 of white image patterns, which correspond to subimages b1 to b4 in FIG. 6A, from the uppermost divided area w1 to the lowermost divided area w4.

In high-rate frame images f1 to f4 shown in FIG. 6C, the same images as the first frame image are overwritten with the divided areas w1 to w4 with white images set therein in the white image patterns p1 to p4 shown in FIG. 6B.

In this case, the white images are set one by one to each of high-rate frame images f1 to f4, from the uppermost subimage b1 to the lowermost subimage b4.

In other words, a white image is set to a subimage located at a division position in each of high-rate frame images.

The division position is different among the high-rate frame images.

A moving image received from an external device is transformed into a group of frame images that includes such a high-rate frame image as shown in FIG. 6C inserted between successive ones of first frame images constituting the moving image.

Effects

As described above, in the image processing apparatus 1 of this embodiment, a moving image received from an external device is transformed into a group of frame images that includes such a high-rate frame image as shown in an example in FIG. 6C inserted between successive ones of first frame images constituting the moving image.

In the example shown in FIG. 6C, since a white image is set to a subimage located at a division position that is different among high-rate frame images, a white image can be displayed over the whole frame as a result of integrating these high-rate frame images by period.

Thus, effects of inserting a white image between first frame images constituting a moving image can be obtained in the same manner as in the above-described first embodiment.

By increasing and decreasing the number of high-rate frame images inserted between first frame images and increasing and decreasing the number of division of one high-rate frame image, the width of a subimage in which a white image is set can be increased and decreased.

As a result, the suppression effects of motion picture blurring and the image contrast can be finely adjusted by adjusting the number of high-rate frame images and the width of a subimage.

Image processing in the above-described embodiments can easily be achieved without the necessity of complex image processing.

First Modification

In the above-described embodiments, regarding operations of generating a white image pattern, the color of a white image is set to normal white (white with an increased luminance value) or gray (white with a slightly decreased luminance value) by comparing the brightness level with a predetermined threshold value in the same manner as in a flow chart shown in FIG. 3.

However, this is not restrictive, and a white image having a luminance value that is variable according to the brightness level may be used.

Figure 7:
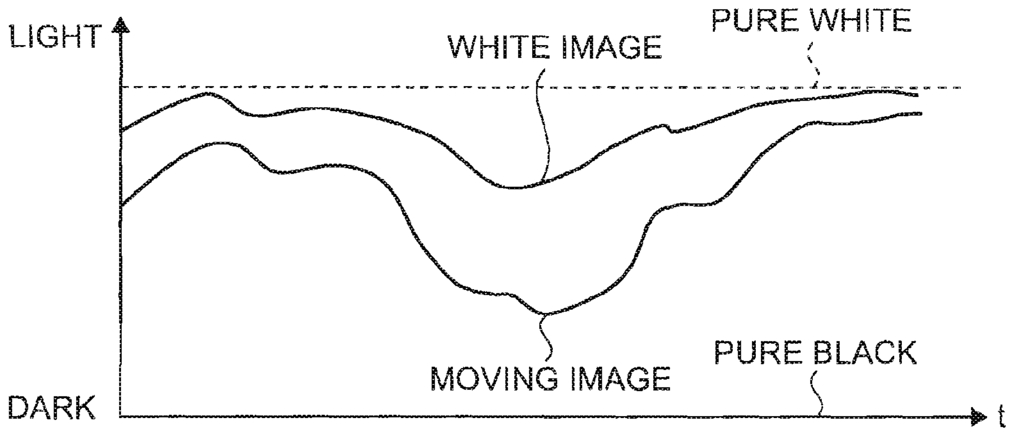
FIG. 7 shows changes in brightness of a moving image and a white image.

FIG. 7 shows changes in brightness of a moving image and a white image.

As shown in the figure, the brightness of a white image may be made variable according to the brightness of a first frame image constituting a moving image.

Thus, the light and darkness of a white image inserted between successive ones of first frame images constituting a moving image can be set in accordance with the light and darkness of a image scene of the moving image.

It is therefore possible to suppress the motion picture blurring while keeping contrast suitable for each image scene.

Second Modification

In the above-described second embodiment, a high-rate frame image is divided in a vertical direction into subimages b1 to b4 and white images are set one by one to the subimages in the order from the uppermost subimage b1 to the lowermost subimage b4, as in an example shown in FIGS. 6A to 6C.

However, the method for dividing a high-rate frame image and the order in which a white image is set to each subimage are not limited to those in this example.

For example, a high-rate frame image may be divided in a vertical direction and white images are set in the order from the lowermost subimage to the uppermost subimage, and a high-rate frame image may be divided in a horizontal direction and white images may be set in the order from the left-most subimage to the right-most subimage or in the order from right-most subimage to the left-most subimage.

In such a structure, effects of inserting a white image between first frame images constituting a moving image can be obtained in the same manner as in the above-described first embodiment.

The suppression effects of motion picture blurring and the image contrast can be finely adjusted by adjusting the number of high-rate frame images and the width of a subimage.

Third Modification

Although an image processing apparatus that implements embodiments of the invention is described above, an image processing circuit may be used instead of the image processing apparatus.

Figure 8:
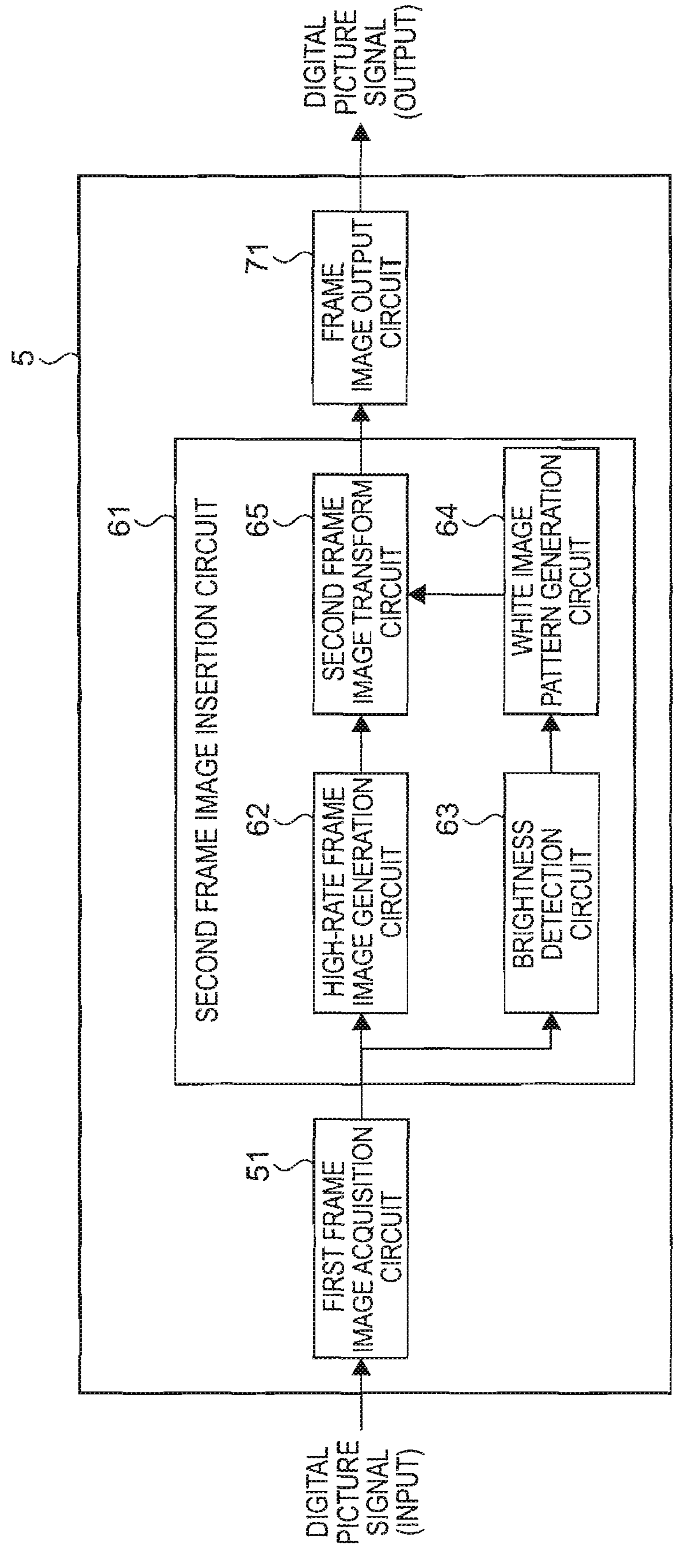
FIG. 8 is a block diagram showing an example of a schematic structure of an image processing circuit according to an embodiment of the invention.

FIG. 8 is a block diagram showing an example of a schematic structure of an image processing circuit according to an embodiment of the invention.

As shown in the figure, an image processing circuit 5 includes a first frame image acquisition circuit 51, a second frame image insertion circuit 61 and a frame image output circuit 71.

The second frame image insertion circuit 61 includes a high-rate frame image generation circuit 62, a brightness detection circuit 63, a white image pattern generation circuit 64 and a second frame image transform circuit 65.

Processing of circuits shown in the figure is the same as that of corresponding components included in the image processing apparatus 1 shown in FIG. 1.

Further, such an image processing apparatus and an image processing circuit as described above may be included in an electro-optical device and an electronic device.

What is claimed is:

1. An image processing apparatus, comprising:

a first frame image acquisition unit to acquire a plurality of first frame images constituting a moving image;

a second frame image insertion section to generate a second frame image, the second frame image including a white image, and insert the second frame image between successive ones of the plurality of acquired first frame images; and a frame image output unit to output the plurality of first frame images with the second frame image inserted therebetween, the second frame image insertion section including:

a high-rate frame image generator configured to generate a high-rate frame image time-sequentially consecutive to each of the plurality of acquired first frame images;

a white image pattern generator configured to generate a white image pattern including the white image for transforming the high-rate frame image into the second frame image; and a second frame image transformer configured to transform the high-rate frame image into the second frame image based on the white image pattern.

2. The image processing apparatus of claim 1, wherein the second frame image transformer transforms the high-rate frame image into the second frame image by setting the white image to the whole of the high-rate frame image based on the white image pattern.

3. The image processing apparatus of claim 1, wherein:

the high-rate frame image generator generates n frames of the high-rate frame image consecutively to one of the first frame images, where n is an integer equal to or greater than two, the n frames of the high-rate frame image having a same image as the one of the first frame images; and each of the n frames of the high-rate frame image is divided into n subimages, and the second frame image transformer transforms each of the n frames of the high-rate frame image into the second frame image by setting the white image to one subimage of the n subimages for each of the n frames of the high-rate frame image, the one subimage being at a division position different among n frames of the high-rate frame image.

4. An electro-optical device comprising the image processing apparatus of claim 1.

5. An electronic device comprising the image processing apparatus of claim 1.

6. An image processing apparatus, comprising:
a first frame image acquisition unit to acquire a plurality of first frame images constituting a moving image;
a second frame image insertion section to generate a second frame image, the second frame image including a white image, and insert the second frame image between successive ones of the plurality of acquired first frame images; and
a frame image output unit to output the plurality of first frame images with the second frame image inserted therebetween,
the second frame image insertion section including:
a high-rate frame image generator configured to generate a high-rate frame image time-sequentially consecutive to each of the plurality of acquired first frame images;
a white image pattern generator configured to generate a white image pattern including the white image for transforming the high-rate frame image into the second frame image;
a second frame image transformer configured to transform the high-rate frame image into the second frame image based on the white image pattern, and
a brightness detector to detect a brightness level of the acquired first frame images;
wherein the white image pattern generator sets a luminance value of the white image included in the white image pattern in accordance with the detected brightness level so as to increase the luminance value of the white image if the detected brightness level exceeds a predetermined threshold and to decrease the luminance value of the white image if the detected brightness level does not exceed the predetermined threshold, and
the white image pattern generator sets the luminance value of the white image by comparing the detected brightness level with the predetermined threshold value.

* * * * *